(12) United States Patent
Lagnado et al.

(10) Patent No.: US 10,862,861 B2
(45) Date of Patent: Dec. 8, 2020

(54) USE OF A NETWORK ADDRESS BY A NETWORK ACCESSORY

(71) Applicant: HEWLETT-PACKARD DEVELOPMENT COMPANY, L.P., Houston, TX (US)

(72) Inventors: Isaac Lagnado, Houston, TX (US); Chunghwa Wu, Taipei (TW); Stephen Doddridge, Grenoble (FR); Markku Suomi, San Diego, CA (US); Aaron J. Slessinger, The Woodlands, TX (US); Thomas W. Dukes, Houston, TX (US); Brett Bernard Faulk, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 255 days.

(21) Appl. No.: 15/749,110

(22) PCT Filed: Jan. 7, 2016

(86) PCT No.: PCT/US2016/012446
§ 371 (c)(1),
(2) Date: Jan. 30, 2018

(87) PCT Pub. No.: WO2017/119887
PCT Pub. Date: Jul. 13, 2017

(65) Prior Publication Data
US 2018/0227265 A1  Aug. 9, 2018

(51) Int. Cl.
*H04L 29/12* (2006.01)
*H04L 29/08* (2006.01)
*H04L 29/06* (2006.01)

(52) U.S. Cl.
CPC ...... *H04L 61/2038* (2013.01); *H04L 61/6022* (2013.01); *H04L 61/6068* (2013.01); *H04L 67/34* (2013.01); *H04L 63/20* (2013.01)

(58) Field of Classification Search
CPC ............. H04L 61/2038; H04L 61/6022; H04L 61/6068; H04L 67/34; H04L 63/20
(Continued)

(56) References Cited

U.S. PATENT DOCUMENTS

| 5,724,510 A | * | 3/1998 | Arndt | H04L 29/12018 370/252 |
| 7,185,204 B2 | | 2/2007 | Narayanaswami et al. | |

(Continued)

FOREIGN PATENT DOCUMENTS

| JP | 2006333103 A | 12/2006 |
| JP | 2015056843 A | 3/2015 |

(Continued)

OTHER PUBLICATIONS

Anick Jesdanun, 2 smartwatches leave the phone behind, Feb. 20, 2015, www.seattletimes.com, https://www.seattletimes.com/business/2-smartwatches-leave-the-phone-behind/ (Year: 2015).*

(Continued)

*Primary Examiner* — Zi Ye
(74) *Attorney, Agent, or Firm* — HPI Patent Department

(57) ABSTRACT

In some examples, a network accessory includes a computing device interface to communicate with a computing device that is separate from the network accessory, a network interface to communicate over a network, and a processor to access a first network address of the computing device and to use the first network address of the computing device to communicate information of the computing device over the network with a network device.

13 Claims, 3 Drawing Sheets

(58) Field of Classification Search
USPC .......................................................... 709/245
See application file for complete search history.

(56) References Cited

U.S. PATENT DOCUMENTS

| | | | |
|---|---|---|---|
| 8,065,435 | B2 | 11/2011 | Zhou et al. |
| 8,923,311 | B2 | 12/2014 | Delorme et al. |
| 9,462,071 | B2* | 10/2016 | Ostrowski ............ H04L 67/2842 |
| 2003/0233499 | A1* | 12/2003 | Choi ...................... G06F 13/387 |
| | | | 710/36 |
| 2008/0155144 | A1 | 6/2008 | Helmecke et al. |
| 2014/0106677 | A1* | 4/2014 | Altman ................. H04B 1/3827 |
| | | | 455/41.2 |
| 2016/0134737 | A1* | 5/2016 | Pulletikurty .......... G06F 3/0227 |
| | | | 715/735 |

FOREIGN PATENT DOCUMENTS

| | | |
|---|---|---|
| KR | 10/2010/0012068 A | 2/2010 |
| KR | 10-1051713 B1 | 7/2011 |
| KR | 10/2014/0033562 A | 3/2014 |

OTHER PUBLICATIONS

VMware Workstation 4.5, "Maintaining and Changing the MAC Address of a Virtual Machine," 2 p.
Wikipedia, "Media Access Control," Nov. 2015, 3 p.

* cited by examiner

USE OF A NETWORK ADDRESS BY A NETWORK ACCESSORY

BACKGROUND

Computing devices can communicate over a network using corresponding network addresses of the computing devices. A computing device can send a packet over the network, where the packet can include a header that has a source network address (to identify the sending computing device) and a destination network address (to identify a target network device on a network to which the packet is to be sent).

BRIEF DESCRIPTION OF THE DRAWINGS

Some implementations are described with respect to the following figures.

DETAILED DESCRIPTION

Figure 1:
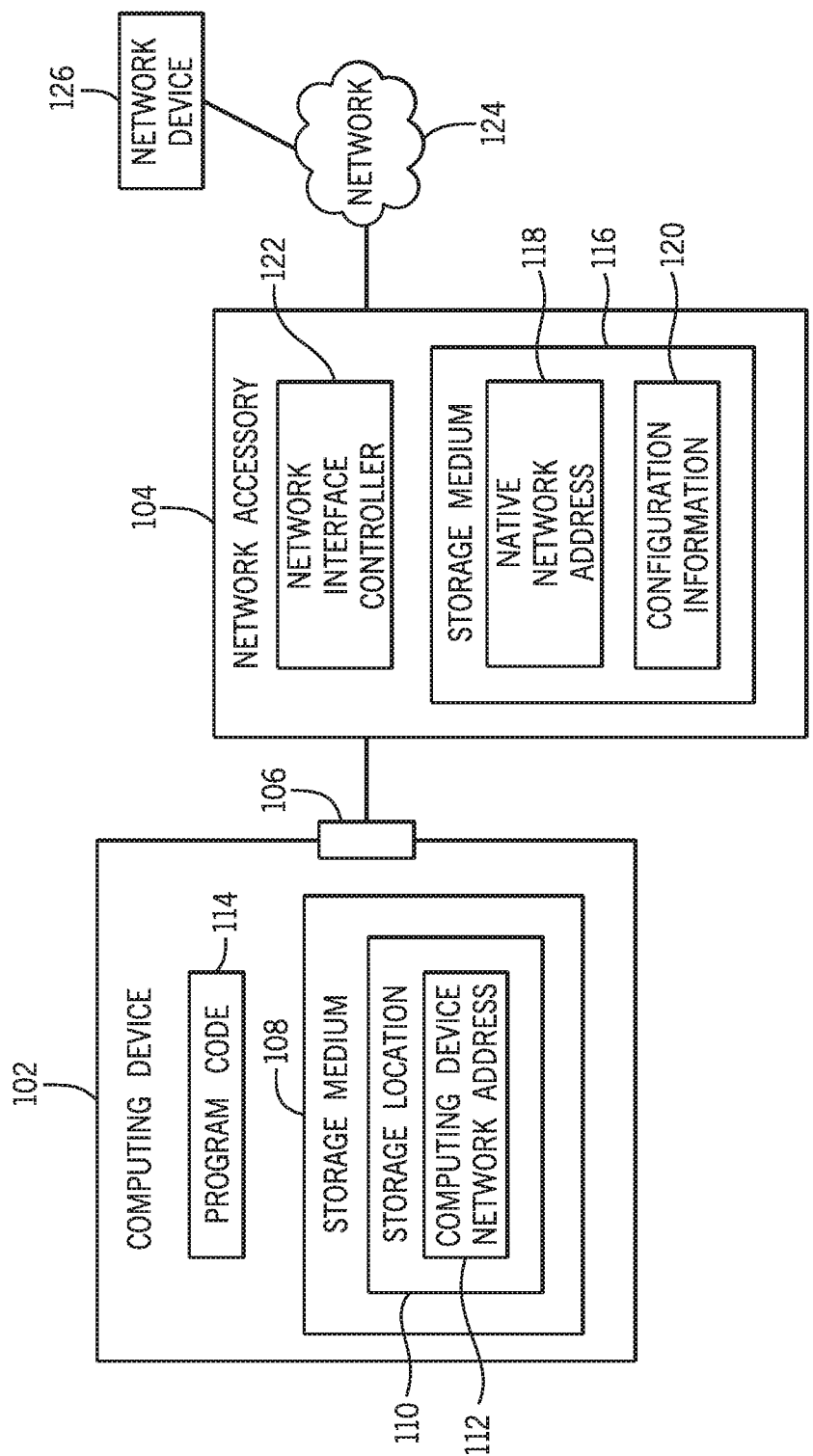
FIG. 1 is a block diagram of an example arrangement that includes a computing device and a network accessory coupled to the computing device, according to some implementations.

Examples of computing devices include notebook computers, desktop computers, tablet computers, smartphones, wearable devices (e.g., smart watches, smart eyeglasses, etc.), game appliances, television set-top boxes, smart televisions, vehicles, and so forth. Some computing devices include embedded network interface devices. A network interface device (sometimes referred to as a network interface controller) is a device that performs network communications on behalf of a computing device. The network interface device can include a combination of hardware and machine readable instructions to perform communications of signals over a network and to implement communication protocols that govern communications over the network. The network can be a wired network or a wireless network.

An embedded network interface device is a network interface device that is included within a housing of a computing device. In other words, the embedded network interface device is provided as part of the computing device by a manufacturer of the computing device.

Other computing devices can be without embedded network interface devices. For example, a tablet computer can be without a network interface device to communicate over a certain type of network, such as an Ethernet network. Note that the tablet computer may include a network interface device to communicate over another type of network, such as a wireless network (e.g. WI-FI network) or a cellular network.

To allow a computing device that is without an embedded network interface device to communicate over a given type of network (e.g. Ethernet network, etc.), a network accessory that is separate and external of the computing device can be connected to the computing device. In some examples, the network accessory can be physically plugged into a port of the computing device. In other examples, the network accessory can have a wireless connection (e.g. BLUETOOTH wireless connection, WI-FI wireless connection, etc.) with the computing device. The network accessory has a network interface to communicate over the given type of network.

The network accessory can include a native network address that is used by the network accessory to communicate information over the given type of network. In some examples, the native network address of the network accessory is a native Media Access Control (MAC) address. A MAC address is used by a MAC sub-layer of a device coupled to a network to communicate data over the network. The MAC sub-layer is part of a data link layer of an Open Systems Interconnection (OSI) model. The MAC sub-layer provides addressing and channel access control mechanisms to allow devices to communicate over a shared network.

In some cases, in an arrangement where a network accessory is communicatively coupled to a computing device, communication of information of the computing device by the network accessory uses the native MAC address of the network accessory in packets sent by the network accessory. A "packet" can refer to a unit of data that can be communicated over a network. A network device that receives such packets containing native MAC address of the network accessory would see the packets as originating from the network accessory, rather than from the computing device to which the network accessory is connected. As a result, the receiving network device may not know the true identity of the computing device that actually sent the packets that are received by the network device. This can pose an issue for network management operations or security operations of the network (discussed further below).

In accordance with some implementations of the present disclosure, a network accessory can be arranged to access a stored network address of the computing device to use for communicating information of the computing device over a network, instead of using the native network address of the network accessory. Packets sent by the network accessory that contain information of the computing device can be configured to use the stored network address of the computing device, and not the native network address of the network accessory. More specifically, each such packet can include a header that has a source network address field and a destination address field, where the source network address field includes the network address of the computing device (instead of the native address on the accessory device), and the destination network address field includes the destination network address of the network device to which the packet is to be sent.

Examples of information of the computing device that can be sent by the network accessory to a network device (or multiple network devices) can include information relating to network management, security management, or any other purpose. An example of network management includes loading or updating program code in the computing device. In such an example, the information of the network device sent by the network accessory can include a request that is sent by the computing device to request an image of the program code that is used to be installed in the computing device. The request can be sent to a server, for example.

As a more specific example, the request that is sent by the computing device can be to request for a boot image to load into the computing device. The boot image can be a Preboot eXecution Environment (PXE) image, which is stored by a PXE server and loaded into the computing device to perform booting of the computing device. The PxE image can include a Basic Input/Output System (BIOS) code, an operating system, and/or other program code.

In the foregoing examples, if the request of the computing device that is sent by the network accessory to a target server (e.g. the PXE server) includes the native MAC address of the network accessory rather than the MAC address of the computing device, then the target server would not know which program code image to retrieve to send back to the computing device for loading into the computing device. Note that different computing devices can be associated with different program code images.

Another example of network management can include using information sent by computing devices to determine which network devices are currently present in the network. If the received information includes the native MAC addresses of network accessories rather than MAC addresses of the corresponding computing devices, then the network would not be able to determine which computing devices are currently present in the network.

For security management, the MAC addresses of computing devices can be used to determine whether any unauthorized computing devices are presently coupled to the network. The security management can include taking action to address the presence of the unauthorized computing device once detected. Security management can utilize either a whitelist or blacklist approach to allow or disallow access to the network. By using techniques or mechanisms according to the present disclosure, an address stored on the computing device can be exposed to the network regardless of whether or not the network interface device is natively embedded in the computing device or is an attached network accessory.

FIG. 1 is a block diagram of an example network arrangement that includes a computing device 102 and a network accessory 104 that is separate from the computing device 102 but communicatively connected to the computing device 102. In some examples, the computing device 102 can have a port 106 to which the network accessory 104 is connected. For example, the port 106 can be a Universal Serial Bus (USB) port, and the network accessory 104 can include a USB connector to connect into the USB port 106. In other examples, the port 106 can be a different type of port. In further examples, it is noted that instead of using the port 106 to provide a wired connection to the network accessory 104, the computing device 102 can include a wireless interface to establish a wireless connection with the network accessory 104. For example, the wireless connection can be a BLUETOOTH wireless connection, a WI-FI wireless connection, or other type of wireless connection.

The computing device 102 includes a storage medium 108, which has a storage location 110. A storage location of the storage medium can refer to a region of the storage medium that can store data. The storage location 110 stores a computing device network address 112, which is the network address of the computing device 102. The computing device network address 112 can be a MAC address.

Note that in some examples, the computing device network address 112 is stored in the computing device 102 that is without an embedded network interface device, in order to allow the computing device 102 with attached network accessory to communicate over a network 124 using the computing device network address 112.

In other examples, the computing device 102 can include an embedded network interface device (not shown in FIG. 1), which can be active at the same time as the network accessory 104, such that the computing device 102 can use either or both of the embedded network interface device or the network accessory 104 to communicate over the network 124. Regardless of whether or not a network interface device is an embedded network interface device or a network accessory, the address stored on the computing device 102 can be configured for use by the network interface device.

In some examples, the computing device network address 112 can be stored in the storage location 110 of the storage medium 108 in the computing device 102 at the factory where the computing device 102 is manufactured. In such examples, the computing device network address 112 is stored in a storage location 110 by a manufacturer of the computing device 102. In other examples, the computing device network address 112 can be provided to the computing device 102 for storing in the computing device 102 after manufacture of the computing device 102, such as during initial setup of the computing device 102 by a user or at some later time.

In some examples, the storage location 110 can be part of a table used by Advanced Configuration and Power Interface (ACPI) program code of the computing device 102. ACPI establishes industry-standard interfaces to enable configuration, power management, thermal management, and other tasks with respect to computing devices. As a specific example, the table in which the computing device network address 112 can be stored is a Differentiated System Description Table (DSDT). In other examples, other storage locations can be used to store the computing device network address 112, where such storage locations can be part of data structures used by ACPI program code or by other types of program code.

The computing device 102 also includes program code 114 that is executable on a hardware processing circuit of the computing device 102. The program code 114 can include BIOS code, an operating system, an application, or other program code. The hardware processing circuit can include a microprocessor, a core of a multi-core microprocessor, a microcontroller, a programmable gate array (PGA), an application specific integrated circuit (ASIC) device, or another type of hardware processing circuit.

The network accessory 104 includes a storage medium 116 that can store a native network address 118 of the network accessory 104. The native network address 118 can include a MAC address.

In some examples, the storage medium 116 can also store configuration information 120. The configuration information 120 can include information to override use of the native network address 118 of the network accessory 104 in favor of the computing device network address 112 to which the network accessory is communicatively connected. More generally, the configuration information 120 can specify that the network accessory 104 is to use the computing device network address 112 instead of the native network address 118 of the network accessory 104. It is also possible that the address stored on the computing device 102 can be configured on the computing device's embedded network interface device to allow exposure of a single network address on the network, regardless of whether an embedded network interface device or a network accessory is used.

It is also possible that an example scenario may exist in which multiple network interface devices are embedded in and/or attached to the computing device 102. An example is with a computing device that has an embedded network interface device, and also has an external network interface device associated with a dock, and possibly another network interface device in the form of a network accessory (e.g. 104). In such an example scenario, the computing device network address can only be configured and used by a single network interface device at any one time. Hence a prioritization list can be provided and configured in the computing device 102, where the prioritization list is used to determine which network interface device of the multiple network interface devices is be configured with the computing device network address, in the scenario where multiple network interface devices are active with the computing device 102.

In yet another example scenario, it is possible that the computing device 102 decides to disable the other network interface devices (make such other network interface devices inactive) that are lower in priority as reflected by the prioritization list, whenever multiple network interface devices are active. Priority configuration parameters can also be made accessible to a user, so that the user can manipulate the prioritization list accordingly. The prioritization list can be used to reconfigure addresses in real time (as network interface devices become active or inactive), or can be used to reconfigure addresses only during certain idle periods, such as during a transition from a power on state to a sleep state, or during a transition of a wake from sleep procedure. If address reconfiguration is only performed during such power transitions, this can allow a network interface device to maintain its constant presence on the network, even if a higher priority network interface device has been installed at some later time.

The network accessory 104 also includes a network interface controller 122, which manages the communication of information over the network 124 (e.g. an Ethernet network or other type of network). The network 124 can be a wired network or a wireless network. The network interface controller 122 can include a combination of a hardware circuit and machine readable instructions to perform communications over the network 124. The hardware circuit can provide a physical layer of the network interface controller 122, to communicate physical signals over the network 124. In addition, the hardware circuit and/or machine readable instructions of the network interface controller 122 can implement communication protocols that are to be used in communicating information in packets over the network 124. Examples of such communication protocols include the MAC protocol and possibly higher level communication protocols, such as the Internet Protocol (IP), Transmission Control Protocol (TCP), and so forth.

As further shown in FIG. 1, a network device 126 is coupled to the network 124 with which the computing device 102 can communicate. Although FIG. 1 shows just one computing device 102, one network accessory 104, and one network device 126, it is noted that there can be multiple computing devices 102 and respective network accessories 104, and also multiple network devices 126.

Based on the configuration information 120, the network interface controller 122 can send information of the computing device 102 over the network 124 using the computing device network address 112 instead of the native network address 118. More specifically, when sending a packet containing information of the computing device 102 to the network device 126 over the network 124, the source address field of a header of the packet can include the computing device network address 112, while the destination address field of the header of the packet can include the network address of the network device 126.

Figure 2:
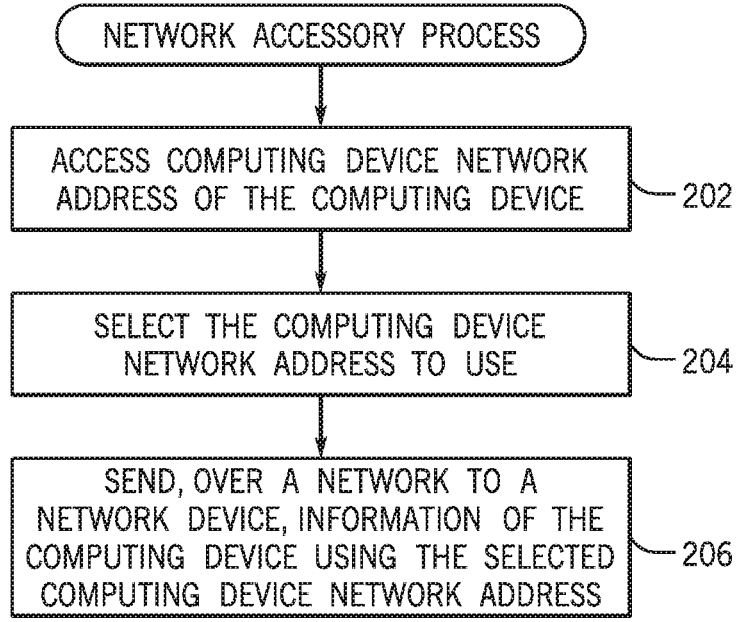
FIG. 2 is a flow diagram of an example process of a network accessory, according to some implementations.

FIG. 2 is a flow diagram of an example process that can be performed by the network accessory 104 according to some implementations. The network accessory 104 accesses (at 202) the computing device network address 112 of the computing device 102. The network accessory 104 selects (at 204) the computing device network address 112 to use.

The network accessory 104 then sends (at 206) over the network 124 to the network device 126, information of the computing device 102 using the selected computing device network address 112.

Figure 3:
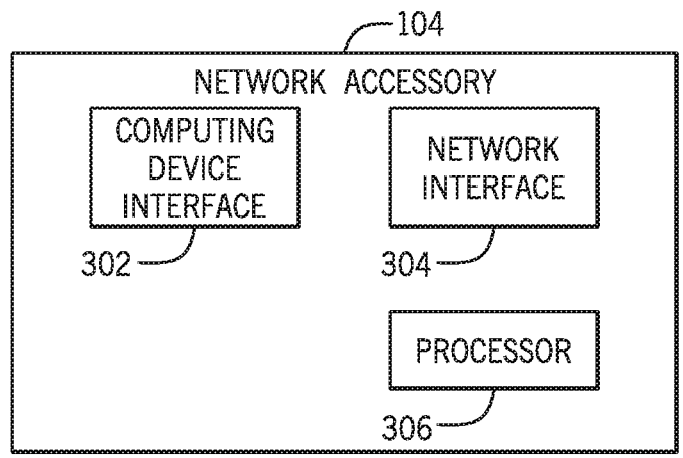
FIG. 3 is a block diagram of an example network accessory, according to some implementations.

FIG. 3 is a block diagram of an example network accessory 104 according to further implementations. The network accessory 104 includes a computing device interface 302 to communicate with the computing device 102 that is separate from the network accessory 104, and a network interface 304 to communicate over the network 124. In some examples, the computing device interface 302 can be a USB interface if the network accessory 104 communicates over a USB bus with the computing device 102. In other examples, the computing device interface 302 can be a different type of interface.

The network accessory 104 also includes a processor 306 that is able to access the computing device network address 112 (stored in the storage location 110 of the computing device 102) and to use the computing device network address 112 to communicate information of the computing device 102 over the network 124 with the network device 126. The processor 306 and the network interface 304 can be part of the network interface controller 122 of FIG. 1, in some examples. A processor can include a microprocessor, a core of a multi-core microprocessor, a microcontroller, a PGA, an ASIC device, or other hardware processing circuit.

Although not shown in FIG. 3, the network accessory can include a device driver that is executable by the processor 306 to access the computing device network address 112 in the storage location 110. This device driver can retrieve the computing device network address 112 for use by the network accessory 104 in communications by the network accessory 104 of information of the computing device 102. The computing device network address 112 stored in the storage location 110 can be exposed by the computing device 102 to the network accessory 104 by a BIOS program code in the computing device 102, or by other program code, such as an operating system or an application. The network accessory 104 can be configured with information identifying a storage location (e.g. 110 in FIG. 1) storing the computing device network address 112. For example, such configuring can be in the form of the configuration information 120, which can include the information identifying the storage location.

Figure 4:
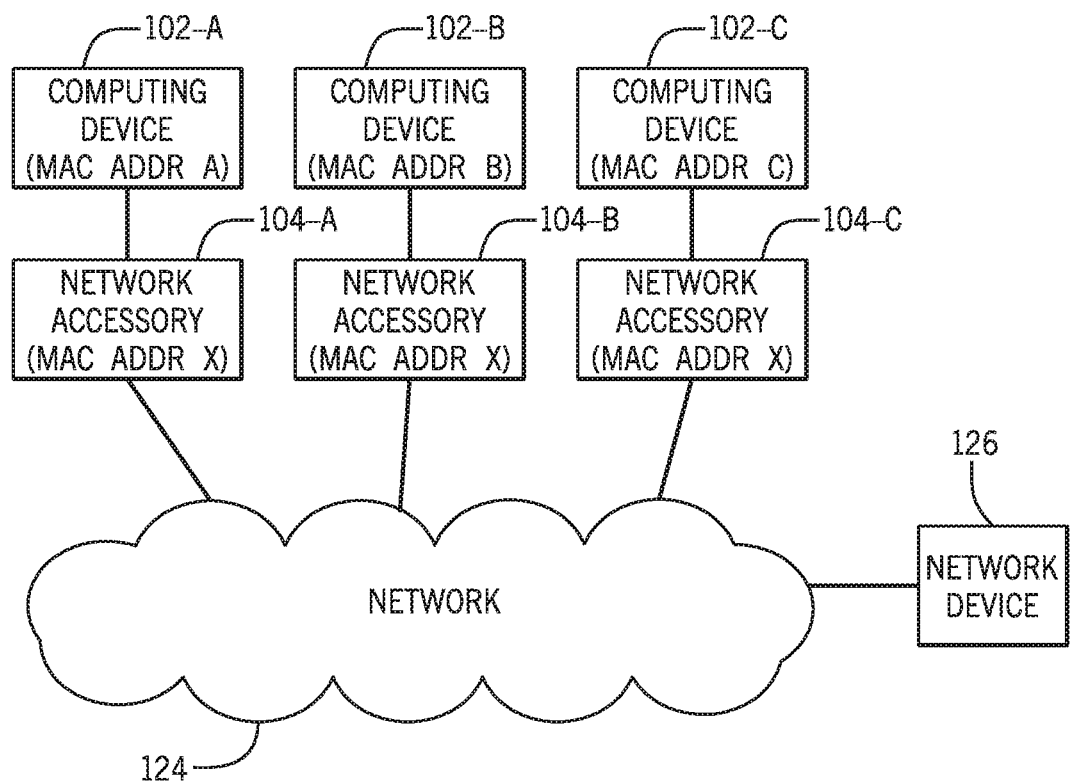
FIG. 4 is a block diagram of an example arrangement that includes computing devices connected to respective network accessories, according to further implementations.

FIG. 4 is a block diagram of an example arrangement that includes multiple computing devices 102-A, 102-B, and 102-C. Each computing device 102-A, 102-B, or 102-C is communicatively coupled to a respective network accessory 104-A, 104-B, or 104-C. It is assumed that the network accessories 104-A, 104-B, and 104-C are made by the same vendor, and thus each of the network accessories 104-A, 104-B, and 104-C is assigned the same MAC address X. In addition, each of the computing devices 102-A, 102-B, and 102-C is assigned a respective MAC address A, B, and C.

In accordance with some implementations of the present disclosure, each network accessory 104-A, 104-B, or 104-C uses the MAC address of the respective computing device to communicate information of the computing device over the network 124 to the network device 126. More specifically, when sending information of the computing device 102-A, the network accessory 104-A uses MAC address A of the computing device 102-A instead of MAC address X of the network accessory 104-A. Similarly, the network accessory 104-B uses MAC address B of the computing device 102-B when sending information of the computing device 102-B over the network 124 to the network device 126, and the network accessory 104-C uses MAC address C of the computing device 102-C when sending information of the computing device 102-C over the network 124 to the network device 126.

In this manner, the network device 126 receives packets that identify the respective computing devices 102-A, 102-B, 102-C. Without implementations of the present disclosure, the network accessories 104-A, 104-B, and 104-C would use MAC address X when sending packets containing information of the respective computing devices 102-A, 102-B, and 102-C, which will cause the network device 126 to be unable to determine the identities of the respective computing devices 102-A, 102-B, and 102-C.

Figure 5:
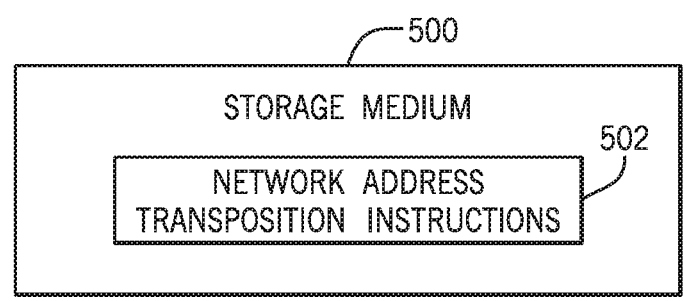
FIG. 5 is a block diagram of an example storage medium that stores machine readable instructions, according to some implementations.

FIG. 5 is a block diagram of an example non-transitory machine-readable or computer-readable storage medium 500 that stores machine readable instructions that upon execution by a network accessory (e.g. network accessory 104) can perform various tasks. The machine readable instructions stored in the storage medium 500 can include network address transposition instructions 502, which upon execution receive configuration information (e.g. configuration information 120 in FIG. 1) to override use of the native network address of the network accessory in favor of the network address of a computing device to which the network accessory is communicatively connected. The network address transposition instructions 502 are responsive to the configuration information to access the network address of the computing device at a storage location in the computing device (e.g., storage location 110 in FIG. 1). The network address transposition instructions 502 can cause the network address of the computing device to be included in at least one packet carrying information of the computing device sent by the network accessory over a network to a network device.

The storage medium 500 can include one or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A network accessory comprising:
a computing device interface to communicate with a computing device that is separate from the network accessory;
a network interface to communicate over a network; and
a processor to:
in response to receiving configuration information to override use of a network address of the network accessory in favor of a network address of the computing device to which the network accessory is communicatively connected,
access a first network address of the computing device and use the first network address of the computing device to communicate information of the computing device over the network to a network device;
communicate the information of the computing device to the network device by storing the first network address of the computing device as a source address in a packet header to be transmitted over the network.

2. The network accessory of claim 1, further comprising a storage medium to store the second network address of the network accessory, the second network address different from the first network address.

3. The network accessory of claim 2, wherein the first and second network addresses comprise Media Access Control (MAC) addresses.

4. The network accessory of claim 1, wherein the processor is to access the first network address from a storage location in the computing device.

5. The network accessory of claim 1, wherein the communicated information comprises a request sent to the network device, the processor to further receive a response to the request, the response containing content that is based on the first network address of the computing device.

6. The network accessory of claim 4, wherein the content contained in the response comprises an image of program code to load into the computing device.

7. A method comprising:
accessing, by a network accessory communicatively coupled to a computing device, a first network address of the computing device, wherein the network accessory is separate from the computing device, and the network accessory stores a second network address of the network accessory;
receiving configuration information at the network accessory to override use of the second network address of the network accessory in favor of the first network address of the computing device;
selecting, by the network accessory, the first network address to use; and
sending, by the network accessory over a network to a network device, information of the computing device using the selected first network address by storing the selected first network address of the computing device as a source address in a packet header to be transmitted over the network.

8. The method of claim 7, further comprising configuring the network accessory with information identifying a storage location storing the first network address, the storage location being in the computing device.

9. The method of claim 7, further comprising storing the first network address in the computing device that is without an embedded network interface device.

10. The method of claim 7, wherein the computing device comprises an embedded network interface device, and wherein both the embedded network interface device and the network accessory are part of a plurality of active network interface devices of the computing device, the method further comprising:
  using a prioritization list to perform one of:
    determine which of a plurality of active network interface devices is to use the first network address, and
    disable at least one network interface device of the plurality of active network interface devices that is lower in priority.

11. The method of claim 7, wherein sending the information of the computing device using the selected first network address is performed as part of a network management or a network security associated with the network.

12. An article comprising a non-transitory machine-readable storage medium storing instructions that upon execution cause a network accessory to:
  receive configuration information to override use of a network address of the network accessory in favor of a network address of a computing device to which the network accessory is communicatively connected;
  responsive to the configuration information, access the network address of the computing device at a storage location in the computing device; and
  include the network address of the computing device as a source address in a packet header of a packet carrying information of the computing device sent by the network accessory over a network to a network device.

13. The article of claim 12, wherein the network address of the computing device is a Media Access Control (MAC) address, and the network address of the network accessory is a MAC address.

* * * * *